United States Patent [19]

Krause

[11] Patent Number: 4,533,185
[45] Date of Patent: Aug. 6, 1985

[54] CONTROL SYSTEM FOR ELECTRO-PNEUMATIC COMPRESSED AIR BRAKES FOR RAIL VEHICLES

[75] Inventor: Friedrich Krause, Munich, Fed. Rep. of Germany

[73] Assignee: Knorr-Bremse GmbH, Munich, Fed. Rep. of Germany

[21] Appl. No.: 569,061

[22] Filed: Jan. 9, 1984

[30] Foreign Application Priority Data

Jan. 14, 1983 [DE] Fed. Rep. of Germany ....... 3301097

[51] Int. Cl.³ ............................................. B60T 13/68
[52] U.S. Cl. ....................................... 303/3; 188/159; 303/15; 303/20; 303/68
[58] Field of Search ................. 303/3, 16, 15, 17, 101, 303/20, 68, 119, 113, 50; 188/156–165

[56] References Cited

U.S. PATENT DOCUMENTS

| | | | |
|---|---|---|---|
| 2,118,412 | 5/1938 | McCune | 188/159 |
| 2,160,209 | 5/1939 | Canetta | 303/101 |
| 2,933,350 | 4/1960 | Hines | 188/159 X |
| 3,716,274 | 2/1973 | Pier | 303/16 X |
| 4,239,292 | 12/1980 | Nagase | 303/3 |

FOREIGN PATENT DOCUMENTS

| | | |
|---|---|---|
| 1605241 | 7/1970 | Fed. Rep. of Germany . |
| 1605239 | 3/1971 | Fed. Rep. of Germany . |
| 1605260 | 3/1971 | Fed. Rep. of Germany . |

Primary Examiner—Douglas C. Butler
Attorney, Agent, or Firm—Pollock, Vande Sande & Priddy

[57] ABSTRACT

Control system for electro-pneumatic compressed air brakes for rail vehicles with a servo valve (1) for control of a pilot pressure and for actuation of electrical contacts (40, 41) operable over a coupling (4) such that, at the beginning of an adjustment of the servo valve in the braking direction, at least one contact (40) is always closed while, at the beginning of an adjustment in the releasing direction, a different contact (41) is closed. The two contacts control the excitation of a brake and release contactor (50, 51) monitoring a brake and release circuit (56, 62) which, when switching, interrupts the circuits monitored by the contacts (40, 41) of the servo valve (1) by opening the coupling (4). Holding circuits for the brake and the release contactor (50, 51) are monitored by contacts of a second switching system (34); a piston (25) actuated by the pilot pressure against the main air line pressure serves to control the latter contacts. The control system permits control of the main air line pressure with sensitive control processes and slight pressure changes by very short excitation of a brake or release circuit (56, 62) but, in case of more extensive control processes with higher pressure changes in the main air line, by a lasting excitation of a brake or release circuit (56, 62) effected through the holding circuits.

13 Claims, 2 Drawing Figures

CONTROL SYSTEM FOR ELECTRO-PNEUMATIC COMPRESSED AIR BRAKES FOR RAIL VEHICLES

SUMMARY OF THE INVENTION

The invention relates to a control system for electro-pneumatic compressed air brakes for rail vehicles, with a manually operable servo valve monitoring a pilot pressure for the control of a main air line pressure, with a first electrical switching system, arranged at the servo valve and having contacts which close only during the adjustment of the servo valve in the release direction, for the control of an electrical relay system having a holding system and monitoring the excitation of a brake and a release circuit, with a second electrical switching system controllable by a piston on which the pilot pressure acts against the main air line pressure for the monitoring of the relay system and with solenoid valves excitable by the brake or release circuit for the control of the main air line pressure.

BACKGROUND OF THE INVENTION

Such a control system is known from German Pat. No. 1 605 260. In the case of this known control system, the electrical relay system can only be controlled after the second electrical control system has responded, i.e., the brake or release circuit can only be excited after shifting of the piston by a pressure difference between the preliminary control and main air line pressures. It follows that, in case of minor control operations at the servo valve which effect only a minor change in the pilot pressure that is not sufficient for the operation of the piston, the electrical relay system will not respond and the brake or release circuit is not excited. Therefore, the minor control operations can only be performed purely pneumatically and, thus, in case of fairly long trains with a correspondingly long delay. Apart from that, the known control system is designed in such a way that no counter-control can be effected by exciting the release circuit if pressure reductions occur in the main air line while the pilot pressure remains constant, so that emergency braking effected from the train can become smoothly and quickly effective. On the other hand, if pressure increases occur in the main air line, e.g., through temperature changes or vibrations, the known control system can respond and can effect undesirable and excessive counter-control by excitation of the brake circuit.

OBJECT OF THE INVENTION

The object of the invention is a control system of the type mentioned in the introduction in such a way that even minor control operations effected at the servo valve can become quickly effective by a correspondingly short excitation of the brake or release circuit, with the simultaneous assurance that pressure changes occurring only in the main air line lead neither to the excitation of the brake circuit nor to that of the release circuit. Furthermore, the control system to be created will, in case of more important control operations at the preliminary control valve, be in a position to excite the brake or release circuit only until the main air line pressure has adjusted to the altered pilot pressure, as is the case with the known control system.

According to the invention, this object is achieved by the fact that the first switching system has additional contacts which close only upon adjustment of the servo valve in the braking direction, that the relay system, with its selection, has contacts which interrupt directly or indirectly the circuits monitored by the contacts of the first switching system, and that the holding system can be cut in and out by the contacts of the second switching system.

This design of the control system enables the relay system, after having been selected by the first switching system, to discontinue this selection when it responds, whereby minor control operations can be transmitted in a sensitive manner but, at the same time, very quickly into correspondingly minor changes in the main air line pressure across the entire length of the train by means of a very short excitation of the brake or release circuit. On the other hand, the holding system responds with the second switching system in case of more important control operations initiated by means of the servo valve and maintains the relay system in an excited state after it has responded until the respective pressure equalization between the pilot pressure and the main air line pressure, so that the more important control operations can also be translated quickly and precisely into correspondingly larger pressure changes of the main air lines across the entire length of the train. However, when only the main air line pressure is changed, only the second switching system can respond but the holding system cannot excite the relay system which is not yet excited and the relay system with the brake or release circuit remains at rest, so that no undesirable counter-control can occur.

BRIEF DESCRIPTION OF THE DRAWINGS

An embodiment of a control system designed in accordance with the invention is shown in the drawing in which.

DESCRIPTION OF PREFERRED EMBODIMENT

Figure 1:
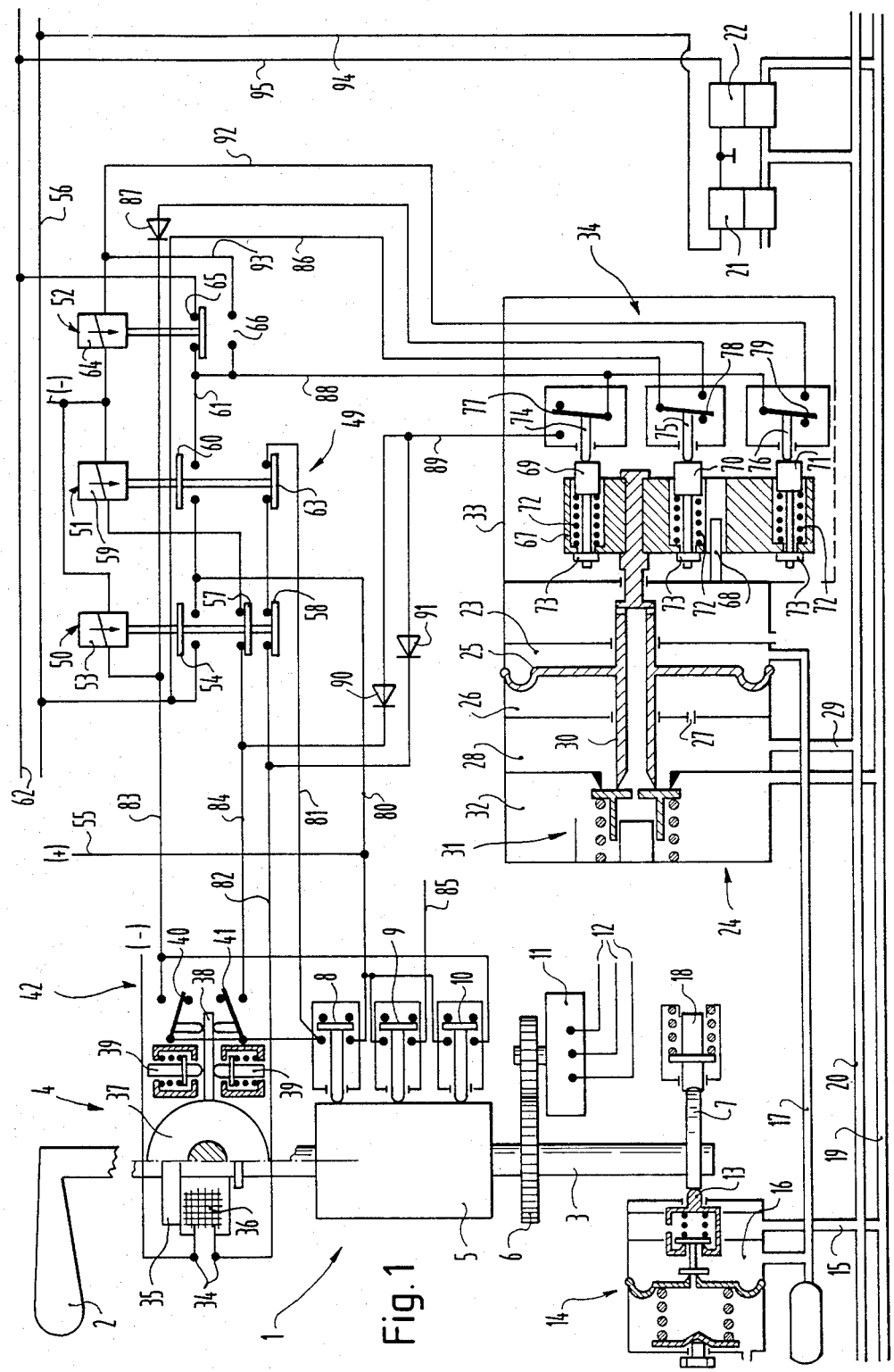
FIG. 1 is a schematic overall view of the control system and FIG. 2 shows a detail of the servo valve also in a schematic representation.

According to FIG. 1, the control system has a servo valve 1 which has a shaft 3 to be turned by means of a handle 2 as a hand operated element. A coupling 4, to be further described, a cam roller 5, a gear wheel 6 and a cam plate 7 are arranged next to each other on shaft 3. Cam roller 5 has several cam areas which are not shown and which interact with at least three electrical contacts 8, 9 and 10 and keep these contacts open or closed in certain rotary positions of shaft 3. Additionally, the cam roller 5 can serve for the operations of pneumatic valves, for example, a rapid stop valve and/or a shut-off valve, in the conventional manner, which is not shown. Gear wheel 6 meshes with the driving pinion of a conventional, known control device 11 for a friction-free brake, e.g., an electrodynamic brake; the friction-free brake, which is not shown, is connected to control device 11 by means of a cable 12. Can plate 7 interacts with the adjustment plunger 13 of a pneumatic pressure controller 14. The pressure controller known as to its design and function, which are described in detail, e.g., in the German Published Application No. 1 605 239. Thus, it is not necessary to describe pressure controller 14; it should merely be pointed out that, in accordance with the respective rotary position of cam plate 7, adjustment plunger 13 is adjusted to a certain axial position and pressure controller 14, which is supplied with compressed air through a pipe 15, produces a corresponding pressure level—a pilot pressure—in its space 16 and the pipe 17 connected to the latter. Cam plate 7 is provided with conventional stop cams, not shown, on an area of its circumference not interacting with the adjustment plunger 13 in any rotary position of shaft 3, and said stop cams interact with a stop tappet 18 which is supported in a resilient back-shifting manner; thus, the individual rotary positions of shaft 3 are perceptibly stopped.

Pipe 15 is connected to a main container pipe 19 which is continuously filled with compressed air from a compressor system (not shown). Additionally, a main air pipe 20 which is to be connected throughout the train is provided, the pressure behavior of which controls, in a manner known per se, pneumatic brake control valves (not shown) which in their turn monitor the compressed air supply to brake cylinders (also not shown) for the friction brake. On the individual vehicles brake and release solenoid valves 21 and 22 are provided which, when excited, control the venting of main air pipe 20 to atmosphere or of the compressed air supply from main container pipe 19 into main air line 20.

Pipe 17 leading the pilot pressure is connected to the control chamber 23 or a relay valve 24. Control chamber 23 is separated from a return control chamber 26 by means of a piston 25. Return control chamber 26 is connected via a nozzle 27 with a valve chamber 28 which over a large cross-section is connected with main air pipe 20 via a pipe 29. Piston 25 is connected with a valve tube 30, which, on the one hand, projects into valve chamber 28 and controls a conventional valve system 31 arranged in its area and said valve system 31 is in a position to fill the valve chamber with compressed air from a chamber 32 connected with main container pipe 19, to handle the venting to atmosphere or to block it off from these two connections. Furthermore, relay valve 24 may be provided with conventional known attachments; i.e., it may correspond, e.g., to the relay valve known from the German Published Application No. 1 605 241. On the other hand, the valve tube 30 projects into the open air or into a part 33 of a casing where an electrical switching system 34, to be explained below, is arranged.

Figure 2:
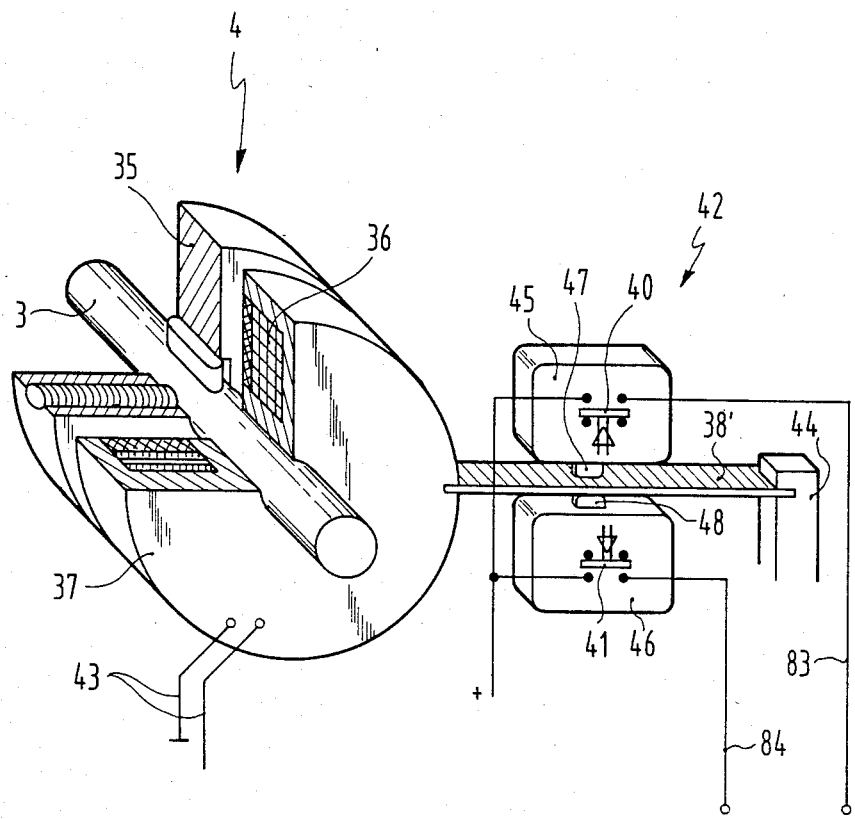

Coupling 4 of servo valve 1, only a principal embodiment of which is in FIG. 1, comprises a coupling part 35 rigidly connected with shaft 3 which can be coupled with an additional coupling part 37 by the excitation of a solenoid 36 in the way of a friction coupling of limited transmission torque. Coupling part 37 carries a switching element 38 on which, from both sides, a resiliently return-shiftable, intercepted plunger 39 can act; therefore, switching element 38, and thus also coupling part 37, can be move to both sides from a central rest position against resilient spring forces. Additionally, coupling part 37 interacts with two electrical contacts 40 and 41 which are open in the rest position of switching element 38 and one contact 40 of which is closed with the movement of the switching element 38 in one direction, and the other contact 41 of which is closed with the movement in the other direction. A structural embodiment of coupling 4 and of the selection of contact 40 and 41 pertaining to a first, electrical switching system 42 is shown in FIG. 2: According to this figure, one coupling part 35 is designed as an annular element which tightly connected to shaft 3 by means of keying or a screw connection. The additional, also annular coupling part 37 containing the annular solenoid 36 rests closely adjacent to coupling part 35 on shaft 3; solenoid 36 can be excited by means of electrical lines 43. A leaf spring 38' representing the switching element is clamped to coupling part 37 with one of its ends and to a solid bearing 44 with its other end. A micro-switch 45 or 46 is arranged on each side of the central area of leaf spring 38' extending radially outwardly from coupling part 37. The switching plungers 47 and 48 of micro-switches 45 and 46 containing contacts 41 which are supported in a resiliently return-shiftable manner rest on both sides against flat spring 38', and can thus partially assume function of plungers 39 according to FIG. 1.

When shaft 3 is rotated according to FIG. 2 in either direction—the brake or release actuation direction for the servo valve (FIG. 1)—coupling part 35 is carried along. With solenoid 36 not being excited, coupling part 37 during these rotary movements remains in its illustrated central rest position which is determined by stretched flat spring 38' and in which the two contacts 40 and 41 are open. However, when solenoid 36 is excited, coupling part 37 follows the rotary movements of coupling part 35 about predetermined rotary angles, and flat spring 38' is resiliently reshaped from its stretched condition into a shape bent towards one or the other side. With this reshaping of flat spring 38', one of contacts 40 or 41 is closed by means of switching plunger 47 or 48. Coupling part 37 is resiliently moved in this state in one direction from its central rest position. When the excitation of solenoid 36 is cut out, coupling part 37 is returned to the central rest position shown in FIG. 2 by the tension of flat spring 38 which is being stretched, whereby the previously closed contact 40 or 41 is reopened. Thus, with the turning of shaft 3, one of contacts 40 or 41 pertaining to the first switching system 42 is closed dependent on the direction of rotation while solenoid 36 is excited and reopened after excitation of solenoid 36 has subsided, whereby coupling 4 as well as switching system 42 return to their initial condition.

Furthermore, the switching system according to FIG. 1 comprises a relay system 49 with a brake contactor 50, a release contactor 51 and a third contactor 52 serving the monitoring of the release. The brake contactor 50, operable by an excitation coil 53, has a first contact 54 which is open when not excited and which is arranged in a line connection 55 from a power source (+) (not illustrated) to a cable of a brake circuit 56. Moreover, brake contactor 50 is equipped with two contacts 57 and 58 which are open when excited. Release contactor 51 has an excitation coil 59, a contact 60, open when not excited, between line connection 55 leading to the power source and a section 61 of release circuit 62 as well as a contact 53 which is closed when not excited. Contactor 52, which is provided with a coil 64, has a contact 65 which is closed when not excited and a contact 66 which is then open.

The second switching system 34, connected with relay valve 24, has a switching plate 67 in casing part 33 which is connected to and movable with valve tube 30 and which is guided in a twist-resistant manner by means of a pin guide 68. Three switching plungers 69, 70 and 71 which run in parallel to the valve tube 30 are axially movably placed into switching plate 67. Each of these switching plungers 69, 70 and 71 is acted upon by a spring 72 which is initially stressed and supported by switching plate 67 as well as unidirected to the pressure action of the piston 25 from the return control chamber 26, and is intercepted by one stop 73. The switching plungers 69, 70 and 71 each terminate in front of actuation plungers 74, 75 or 76 to each of which one contact 77, 78 or 79 is assigned. Contact 77 is open in the illustrated central position of piston 25 while valve system 31 is closed, and it closes only upon shifting of piston 25 under the predominant pressure from control chamber 23 through the pilot pressure. Contact 78 is also open in the central position, but it closes upon shifting of piston 25 under the predominant action from return control chamber 26 and thus of the main air line pressure. Contact 79 is also open in the central position of piston 25 and closes upon shifting of this piston 25 under the predominant main air line pressure action.

A branch pipe 80 leads from pipe connection 55 connected to the power source to servo valve 1, and is there connected with one side each of contacts 8, 9 and 10. Two contacts 8 and 9 are open in the driving or release position of servo valve 1 and, in the braking positions of the latter, contact 8 is closed until full braking position is reached, and contact 9 until an emergency braking position is reached. Contact 10 is closed only in the emergency braking position of servo valve 1. On the other hand, contact 8 is connected with one of the sides of the two contacts 40 and 41 and with a line 81 which leads to solenoid 37, grounded on the other side (−), of coupling 4 with its electrical line connections 43 through contact 63 of release contactor 51 and contact 58 of brake contactor 50 and an additional line 82; thus, contacts 8, 63 and 58 are cut into a circuit in series with solenoid 36. From the second side of contact 40 which closes only upon rotation of shaft 3 by means of the handle 2 in the direction of braking or the amplification of already initiated braking while solenoid 36 is excited, a line 83 leads to the second side of contact 10 and, in parallel to it, to excitation coil 53, grounded on the other side, of brake contactor 50. From the second side of contact 41, which closes only upon rotation of shaft 3 in the adjustment direction to the brake releasing and with an excited solenoid 36, a line 84 leads to excitation coil 59, grounded on the other side, of release contactor 51 through contact 57 of brake contactor 50. To the second side of contact 9, cable 85 is connected which leads to an electro-dynamic brake (not shown). A branch line 86 coming off brake circuit 56 close to brake contactor 50 leads to excitation coil 53 or line 83 through contact 78 of the second switching system 34 and a diode 87 opening in this current flow direction. A line 88 leads to the two contacts 77 and 79 of the second switching system 34 from section 61 of release circuit 62. On the other side, contact 77 is connected, through a line 89 and a diode 90 opening in this current flow direction, with line 84 between the two contacts 41 and 57 and, in parallel thereto, via a third diode 91 opening also in this current flow direction, with the line 82 between solenoid 36 and contact 58. The second side of contact 79 is connected with coil 64, grounded on the other side, of contactor 52 through a line 92. Contact 66 is arranged in a connection 93 from section 61 of release circuit 62 to line 92 or excitation coil 64. Contact 64 is arranged between section 61 and release circuit 62.

The brake solenoid valve 21 can be excited from the brake circuit 56 via a line 94 and release solenoid valve 22 from release circuit 62 over a line 95.

In their rest position with brakes released, the parts of the control device assume the switching positions shown in FIG. 1. Servo valve 1 is in the release or driving position, pressure controller 14 initiates the action in this instance from main container line 19 into pipe 17, and thus in control chamber 23 of relay valve 24, a pilot pressure corresponding to the control pressure level in main air line 20. Accordingly, relay valve 24 produces a control pressure level in main air line 20 by means of its valve system 31, and piston 25 is in its central position with valve system 31 being then closed again and subject to equally high compressed air action from both sides. Contacts 8, 9, 10 as well as 40 and 41 are open at servo valve 1, and solenoid 36 is not excited. Contactors 50, 51 and 52 of relay system 49 are currentless and their contacts are in the corresponding, described switching positions shown in FIG. 1. Contacts 77, 78 and 79 of the second switching system 34 are also open. Brake and release circuits 56 or 62 are currentless, and the brake as well as the release solenoids 21 or 22 are unexcited and closed.

When, for the purpose of braking, servo valve 1 is adjusted in the braking direction by rotation of shaft 3 correspondingly using the handle 2, the two contacts 8 and 9 close just before the rotary position of shaft 3 corresponding to the first braking stage is reached, so that, on the one hand, the electro-dynamic brake is cut in via cable 85 and, on the other hand, the two still open contacts 40 and 41 are subjected to voltage on one side through contact 8 and, at the same time, solenoid 36 is excited through line 81 and the two closed contacts 63 and 58 as well as line 82. By rotating shaft 3 further into the rotary position corresponding to the first braking stage, switching element 38, as described above in connection with FIG. 2, is moved from its rest position through coupling 4 closed while contact 41 remains open. By the closure of contact 40, line 83 is connected with the power source, so that excitation coil 53 of brake contactor 50 is excited and closes contact 54 and opens the two contacts 57 and 58. Diode 87 prevents, in this instance, a flow of current to contact 78 of the second switching system 34. Brake circuit 56 is connected to the power source through contact 54, and thus brake solenoid valves 21 are excited on the individual vehicles via line 94 and effect venting and thus pressure reduction for main air line 20. Voltage is applied at the same time to one side of contact 78 from brake circuit 56 through branch line 86. Simultaneously with these processes, pressure controller 14 is adjusted through cam plate 7 to a pressure level which is reduced and corresponds to the first braking stage, whereby the pressure prevailing in control chamber 23 of relay valve 24 is correspondingly reduced. Since the volume charged by the pilot pressure is relatively low, the pressure reduction of the pilot pressure which involves a "jump" and thus reaches a minimum value is effected relatively quickly for the adjustment to the first braking stage, and piston 25 is accordingly moved towards the right by the pressure in main air line 20 which does not drop so quickly and thus soon predominates and thus in the return control chamber 26, in accordance with FIG. 1. With this movement, piston 26 opens, on the one hand, a discharge valve of valve system 31 for the venting of main air line 20 to atmosphere, and closes, on the other hand, the two contacts 78 and 79 of the second switching system 34 through switching plungers 70 and 71, while contact 77 remains open under compression by spring 72. A holding circuit for brake contactor 50 is closed in this instance through contact 78, and this holding circuit is supplied with current from the power source through close contact 54 and brake circuit 56 and keeps excitation coil 53 of brake contactor 50 connected to the power source through branch line 86, closed contact 78 and diode 87. However, the closing of contact 79 has no effect whatsoever. The opening of contact 58 which is also effected with the pulling-up of brake contactor 58 interrupts the excitation circuit solenoid 36, so that coupling 4 opens and coupling part 37 is returned to the central rest position by means either of one of plunger 39 or the tension of flat spring 38' during the opening of contact 40. With the opening of contact 40, excitation coil 53 is actually separated from the power source on the part of servo valve 1, but it remains connected to the power source and, thus, excited through the holding circuit comprising branch line 86, contact 78 and diode 87. Therefore, brake contactor 50 remains excited and keeps brake circuit 56 connected to the power source. When a reduced pressure level corresponding to the first braking stage is reached in main air line 20, and thus in return control chamber 26, piston 25 returns to its illustrated central position, causing the two contacts 78 and 79 to open. This interrupts the holding circuit for brake contactor 50; the latter drops, closing the two contacts 57 and 58 and opening contact 54. Brake circuit 56 now loses its current and brake solenoid valve 21 drops, so that main air line 20 is no longer vented through brake solenoid valve 21. At the same time, valve system 31 of relay valve 24 returns into its final position upon return movement of piston 25 to its central position, so that venting of main air line 20 is also interrupted there. The pressure which was reached in main air line 20 corresponding to the first braking stage is thus maintained. The closing of contact 57 has no further effect while contact 31 is open, but the closing of contact 58 closes again the excitation circuit for solenoid 36 so that coupling 4 is closed again. However, if handle 2 is not moved further when the first braking stage is reached and, thus, the shaft 3 was not turned further or is no longer turned, switching element 38 is in its central position while contacts 40 and 41 are open, so that the closing of coupling 4 has no further effect. Thus, the first braking stage is reached.

If, initially, not the first braking stage is set but a higher braking stage up to full braking, processes come to pass which correspond to those described above, whereby only shaft 3 is turned until the corresponding braking stage is reached and the pilot pressure and the main air line pressure are lowered to accordingly lower pressures corresponding to the braking stage.

If, proceeding from the first braking stage, the braking effect is to be amplified, this can be effected in a sensitive manner in one or more small steps or in a relatively large step. In the first case, when amplifying by only a small step, shaft 3 is turned only by a small amount using handle 2, whereby switching element 38 is moved via coupling 4 as already described and closes contact 40. The brake contactor 50 is pulled up and excites brake circuit 56 through closing contact 54, as well as brake solenoid valve 21, while at the same time it prevents excitation of release contactor 51 by the opening of contact 57 and interrupts the excitation circuit for solenoid 36 by opening of contact 58. The opening of coupling 4 leads to setting back of coupling element 37—even if shaft 3 turns somewhat further—into the central position owing to the restoring force acting on switching element 38 or being exerted by flat spring 38, whereby contact 40 reopens at the same time. At the slight braking amplification stage, the pilot pressure in pipe 17 is only reduced by so little by pressure controller 14 that the correspondingly slight pressure reduction in control chamber 23 is not sufficient for moving piston 25 of relay valve 24 to the point of closing contact 78, so that the latter remains open and the aforementioned holding circuit for brake contactor 50 is still interrupted upon opening of contact 40. Therefore, brake contactor 50 drops again upon opening of contact 40 and interrupts the current supply to brake circuit 56, so that brake solenoid valve 21 also closes again. Contacts 57 and 58 also close, whereby the excitation circuit for solenoid 36 is closed again and the coupling thus closes again, with shaft 3 no longer turning. Therefore, the second switching system 34 is not switched with this small amplification of the braking stage and correspondingly small rotary movement of shaft 3, brake circuit 56 is excited only for a short time, and brake solenoid valve 21 is only opened for a short time, so that the pressure prevailing in main air line 20 is also only reduced by a slight amount.

However, if the braking is amplified by a large value, shaft 3 is to be turned further by a correspondingly large amount in the direction of braking, using handle 2, whereby, initially, the above-described processes—closing of contact 40 and exciting of brake contactor 50—occur. However, at the same time, the pilot pressure in line 17 and in control chamber 23 is quickly reduced via the pressure controller 14 by a considerable amount which, as described in connection with the first braking stage, is sufficient for moving piston 25 towards the right according to FIG. 1.

With its movement, piston 25 opens an air-vent valve on valve system 31 for the main air line, so that a local pressure reduction is introduced thereinto by relay valve 24, and closes the two contacts 78 and 79. While the closing of contact 79 shows no further effects, the closing of contact 78 actuates a holding circuit for brake contactor 50. Current flows through branch line 86 from the excited brake circuit 56 and also through contact 78 and diode 87 to the excitation coil 53 of brake contactor 50, so that the latter remains excited despite the opening of contact 58 and thus interruption of the excitation circuit for solenoid 36, opening of coupling 4 and opening of contact 40 by the resilient restoration of coupling part 37 into its central position. Therefore, brake circuit 56 with brake solenoid valve 21 remains excited and compressed air is also removed from main air line 20 through brake solenoid valve 21 to achieve a reduction in pressure. In this way, a quick and uniform pressure reduction is obtained across the entire length of main air line 20. As soon as this pressure reduction of the main air line pressure corresponds to that which was initiated for the pilot pressure by means of the preliminary servo valve 1 or its pressure controller 14, piston 25 returns into its illustrated central position upon closing of valve system 31 and opening of contacts 78 and 79. While the opening of contact 79 has no additional consequences, the opening of contact 78 interrupts the holding circuit for brake contactor 50. Hence brake contactor 50 drops and interrupts the current supply to brake circuit 56 so that brake solenoid valve 21 closes. The venting or pressure reduction is therefore terminated for main air line 20 through the relay valve 24 as well as the brake solenoid valve 21 and the achieved braking pressure is maintained.

Braking amplification according to the foregoing description may be repeated several times in successive small steps as well as in large steps until the full braking effect is obtained, and the small steps and large steps may even be mixed with each other.

The following brake release can also be effected in small or large steps:

When initiating only a slight releasing step, shaft 3 is turned only by a slight amount in the releasing direction, whereby switching element 38 or flat spring 38' is moved in the closing direction of contact 41 through the closed coupling 4 by carrying along coupling part 37 in a corresponding manner. Upon closing of contact 41, excitation coil 59 of release contactor 51 is excited over line 84 and closed contact 57, so that its contact 60 closes and contact 63 is opened. By closing of contact 60, release circuit 62 is connected with the power source through section 61 and closed contact 65, whereby release solenoid valve 22 is excited, opens and feeds compressed air into main air line 20 from main container line 19 in order to raise the main air line pressure prevailing in it. The slight adjustment of shaft 3 effects only a slight increase in the pilot pressure in pipe 17 and in control chamber 23 through pressure controller 14 so that piston 25 of relay valve 24 is moved from its central position, according to FIG. 1, towards the left only by very slight values which are not sufficient to close contact 77. Contacts 78 and 79 remain open anyway with the direction of the motion towards the left of piston 25 since switching plungers 70 and 71 are lifted off actuation plungers 75 and 76 in this instance. With the opening of contact 63, the excitation circuit for solenoid 36 is interrupted, coupling 4 opens and contact 41 is opened by the spring-back resilience of actuation plunger 38 or of flat spring 38', so that the excitation circuit for release contactor 51 drops again, contact 60 opens and contact 63 closes again. Coupling 4 is thus closed again by the excitation of solenoid 36 but, at this point in time, shaft 3 which was turned by only a slight amount is again at rest, so that the contact 41 remains open. Therefore, release contactor 51 is excited for only a very short time, so that release circuit 62 and release solenoid valve 22 are also supplied with current for a short time only. Only a slight amount of compressed air is thus fed from main container line 19 into main air line 20 so that a slight pressure increase is effected in the latter corresponding to the desired slight release stage.

When initiating a large release stage, shaft 3 is turned in the release direction by a corresponding large amount, wherein, initially, the above described processes take place until release contactor 51 is excited and, thus, release circuit 62 as well as release solenoid valve 22. At the same time, pressure controller 14 is, however, adjusted by a large value so that it feeds a considerable increase in the pilot pressure into pipe 17 and control chamber 23, and thus causes piston 25 to shift towards the left in accordance with FIG. 1. In this instance, besides the opening of valve system 31 in the direction of a resupply of compressed air from main container line 19 into main air line 20, contact 77 and, with it, a holding circuit for release contactor 51 are closed.

The excitation coil 59 of release contactor 51 is connected wit6h the power source in parallel with contact 41 from section 61 connected with the power source through closed contact 60 and line 88, closed contact 77, line 79 and diode 90, so that release contactor 51 remains excited even after the opening of contact 41. At the same time, line 82 is also connected to the power source, through contact 77, line 89 and diode 91, so that, upon opening of contact 63 owing to the excitation of release contactor 51, solenoid 36 remains excited and thus coupling 4 is closed and also release contactor 51 is excited and release circuit 62 remains live and release solenoid valve 22 remains open. The sustained excitation of coupling 4 while release contactor 51 is already excited serves the purpose that, if sudden braking is required, contact 40 can be closed by a corresponding turning of shaft 3 in braking direction using coupling 4, even if a release process is under way with an excited release contactor 51. The closing of contact 40 which is effected, as already explained in connection with the braking processes, effects an excitation of brake contactor 50 which, by opening contact 57, interrupts the excitation of release contactor 51 as already mentioned and, thus, interrupts also a releasing process possibly just under way in the described manner. Without this sudden initiation of a braking process, the release process continues with the excited release contactor 51 until the main air line pressure is raised to a pressure level corresponding to the pilot pressure and piston 25 returns, thus, into its central position by closing valve system 31 and opening contact 77. In this way, the holding circuit for the release contactor 51 as well as the circuit for the solenoid 36 are interrupted, release contactor 51 opens contact 60 and closes contact 63, release circuit 62 loses current and release solenoid valve 22 drops and interrupts the resupplying of compressed air into main air line 20. Closing of the contact 63 effects again the closing of coupling 4 so that, subsequently, additional small or large steps in the braking or release direction may be initiated in the above explained ways. The large release step is now terminated.

With the subsequent setting of the drive or release position on the servo valve 1, contact 8 is opened after the actuation of release contactor 51 in accordance with the above described release processes in an intermediate position between the rotary position of shaft 3 corresponding to the first braking stage and the drive or release position, whereby contacts 40 and 41 as well as line 81 are separated from their connection to the power source led via branch line 80. If, at this point in time, contact 77 is open, release contactor 51 also drops and coupling 4 opens, so that the electrically controlled supply of compressed air is interrupted through release solenoid valve 22 into the main air line. If, however, at the stated point in time, contact 77 is closed, i.e., the relay valve is in release position and release contactor 51 is excited, both excitation coil 59 of release contactor 51 and solenoid 36 remain excited via contact 77 and diodes 90 and 91, and the electrically controlled release process continues running with the excited release solenoid valve 22 until, upon pressure equalization between the pilot pressure and the main air line pressure, piston 25 returns to its central position and, on the one hand, closes valve system 31 and, on the other hand, opens contact 77 and thus interrupts the stated excitations. Since, when the drive or release position is reached, the contact 9 is also reopened and the electrodynamic brake is cut out, the initial state is regained. It remains to be stated that, also in this instance, coupling 4 remains closed until release contactor 51 drops, and continued readiness is therefore maintained for the initiation of electro-pneumatic braking by excitation of brake circuit 56 with simultaneous forced interruption of release circuit 62.

Only contacts 54 and 60 on brake and release contactors 50 and 51 are to be made of a sufficient size for the switching of larger current intensities, and the remaining contacts 57, 58 and 63 may be designed as pure control contacts for only a weak current. By the same token, contacts 40 and 41 as well as 77, 78 and 79 may be designed for the switching of only weaker current. Diodes 87 and 90 exclude the overloading of the contact of weaker design.

If, while contact 77 or 78 is still closed, one of contacts 40 or 41 should be closed, no current can flow in this current flow direction from line 83 or 84 through closed contact 77 or 78 to brake or release circuit 56 or 62 with the high current intensities occurring there, owning to the blocking effect of diode 87 or 90; brake and release circuits 56 and 62 can only be switched by contacts 54 and 60 and, as will be described below, by contact 65.

With the setting of rapid braking on the servo valve 1, contact 10 is closed and, through it, line 83 is connected with the power source by by-passing contact 40. Therefore, brake contactor 50 is excited in any case and initiates electropneumatic braking by exciting brake circuit 56.

The third contactor 52 serves to exclude undesirable consequences resulting from errors in the control system: If, for any reason, release contactor 51 should get stuck in its excited position when contact 60 is closed, e.g., due to mechanical or electrical errors, the pressure prevailing in main air line 20 is continuosly raised by lasting excitation of release circuit 62 and of release solenoid valve 22. Without the third contactor 52, this would lead to overloading of main air line 20, and subsequent braking would at least be very much inhibited if not even excluded by continuing excitation of release circuit 62. These undesirable consequences are excluded by the third contactor 52.

If, owing to the permanent excitation of release circuit 62, the pressure prevailing in main air line 20 rises above the pilot pressure in pipe 17 and in control chamber 23, piston 25 of relay valve 24 is moved towards the right according to FIG. 1 whereby, on the one hand, local venting of the main air line 20 occurs through valve system 31 and, on the other hand, also switch 79 of the second switching system 34 is closed. Thus, coil 64 is excited from section 61 via line 88, closed contact 79 and line 92, contactor 52 is pulled up, opens contact 65 and closes contact 66. By the opening of contact 65, the current supply of release circuit 62 is interrupted, so that release solenoid valve 22 drops and does not cause an additional pressure rise in main air line 20. The closing of contact 66 results in a holding effect for contactor 52 through connection 93, so that contactor 52 remains excited even upon subsequent opening of contact 79 and keeps release circuit 62 without current. Only if, after a subsequent repair or owing to other circumstances, release contactor 51 is returned into its unexcited position and contact 60 opens, contactor 52 drops and goes back into the switching position shown in FIG. 1.

In deviation from the above described embodiment, it is also possible to design the servo valve 1 without a special minimum value for the pressure reduction of the pilot pressure when passing from the drive or release position to the first braking stage; in this case, the initiation of the first braking stage can already be effected by exciting brake contactor 50 for a short time, using only contact 40, without closing contact 78, and therefore without exciting the holding circuit as was done in the above described sensitive control.

Servo valve 1 and/or relay valve 24 can of course be equipped with conventional supplemental systems: For example, servo valve 1 can be equipped with a pneumatic rapid deceleration valve for direct venting of the main air line 20, with a shut-off servo valve, and charge relief valve, an adaptation system and/or a dead man monitoring. Corresponding systems can be provided on the relay valve 24, such as a shut-off valve for the main air line, charge releif and adaptation system, remote controllable rapid deceleration valve and or dead man system.

It goes without saying that the piston actuating the second switching system, i.e., piston 25 according to FIG. 1, need not pertain to relay valve 24; a separate piston acted upon by the main air line pressure against the preliminary control pressure can be provided for the control of switching system 34. In this case, relay valve 24, together with the entire pneumatic control system, can be designed in the conventional known manner.

In the case of switching system 34, spring 72 must be compressed when switching plunger 69 is stopped, in the embodiment shown in FIG. 1 upon movement of piston 25 towards the right, i.e., when main air line pressure predominates. It is, of course, possible to design the actuation system for contact 77, for example, by rotating it by 180° in such a way that, when the shifting which was mentioned occurs, switching plunger 69 lifts off actuation plunger 74 so that, therefore, switching plunger 79 only comes to rest against actuation plunger 74 in the central position of piston 25 and closes contact 77, the moving direction of the piston 25 being opposite to the one mentioned above, i.e., towards the left according to FIG. 1, when the preliminary control pressure predominates. This design results in reduced movement resistances for piston 25 in the direction of the movement occurring during braking.

For the sake of completeness, it should also be mentioned that brake and release circuits 56 and 62 can, of course, extend in the conventional manner through all vehicles forming a train, whereby, each vehicles is equipped, if possible, with at least one brake solenoid valve 21 and a release solenoid valve 22 for the local control of the pressure prevailing in main air line 20.

What is claimed is:

1. Control system for electropneumatic compressed air brakes for rail vehicles, with a manually operable servo valve (1) monitoring a pilot pressure for the control of a main air line pressure with a first electrical switching system (42) arranged at said servo valve (1) and having contacts (41) which close only during adjustment of said servo valve (1) in the release direction, for the control of an electrical relay system (49) having a holding system and monitoring the excitation of a brake and a release circuit (56 and 62), with a second electrical switching system (34) controllable by a piston (25) on which the pilot pressure acts against the main air line pressure for monitoring said relay system (49), and with solenoid valves (22) excitable by said release circuit (62) for control of the main air line pressure, said first switching system (42) having additional contacts (40) which close only upon adjustment of said servo valve (1) in the braking direction, said relay system (49), with its selection, having contacts (58, 63) which interrupt the circuits monitored by the contacts (40, 41) of said first switching system (42), contacts (77, 78) of said second switching system (34) enabling said holding system to be cut in and out.

2. Control system according to claim 1, wherein said first switching system (42) has a switching element (38, 38') which is self-restoring and can be coupled with a manually operated element (2, 3) of said servo valve (1)

through an electrically switchable coupling (4) for its contacts (40, 41), a switching circuit of said coupling (4) being monitored by the relay system (49).

3. Control system according to claim 2, wherein said coupling (4) has a first coupling part (35) which is rigidly connected to said manually operated element (2, 3), a second coupling part (37) which is relatively shiftable to said first coupling part (35) and resiliently movable towards both sides from its central rest position, and a solenoid (36) which couples both coupling parts (35, 37) when it is excited, said second coupling part (37) being connected to said switching element (38, 38') for the contacts (40, 41) of said first switching system (42).

4. Control system according to claim 3, wherein said coupling parts (35, 37) are designed as an adjustment shaft (3) for annular elements surrounding said servo valve (1).

5. Control system according to claim 4, wherein said switching element is a leaf spring (38') clamped to said movable coupling part (37) and to a rigid support (44) and extends at least substantially radially projecting from said second coupling part (37), said contacts (40, 41) being arranged on both sides of said leaf spring (38') at about its central section.

6. Control system according to claim 3, wherein said relay system (49) has a brake contactor (50) with the contacts (54) monitoring the brake circuit (56) and a release contactor (57) with contacts (60) monitoring the release circuit (62), the brake and release contactors (50, 51) each having an additional contact (58, 63) and these additional contacts (58, 63), switching oppositely to the contacts (54, 60) monitoring the brake and the release circuit (56, 62), being arranged in series in a circuit which can interrupt the circuits monitored by the contacts (40, 41) of the first switching system (42).

7. Control system according to claim 6, wherein the additional contacts (58, 63) of said brake and release contactors (50, 51) are arranged in series in a circuit passing through said solenoid (36) with a switching contact (8) which is closed only in the braking positions of said servo valve (1).

8. Control system according to claim 6 or 7, wherein said second switching system (34) has a first contact (77) which is closed only when said piston (25) is impacted predominantly by the pilot pressure and which is arranged in a first line connection (88, 89) branching off from said release circuit (62) and leading to an excitation coil (59) of said release contactor (51) through a diode (90) opening in this current flow direction, and wherein said second switching system (34) has a second contact (78) which is closed only when said piston (25) is impacted predominantly by the main air line pressure and which is arranged in a second line connection (86) branching off from said brake circuit (56) and leading to an excitation coil (53) of said brake contactor (50) through a diode (87) opening in this current flow direction.

9. Control system according to claim 8, wherein said brake contactor (50) has a third contact (57) which switches in opposition to its contact (54) monitoring said brake circuit (56) and which is connected immediately before said excitation coil (59) of said release contactor (51).

10. Control system according to claim 8, wherein said second switching system has a third contact (79) which closes with said second contact (78) and which is arranged in a third line connection (88, 92) branching off from said release circuit (62) and leading to a coil (64) of a third contactor (52) belonging to said relay system (49), and wherein said third contactor (52) has a contact (65) which opens when excited and which is arranged in said release circuit (62) downstream of the branching-off of said first and third line connections (88, 89, 92) and an additional contact (66) which switches in the opposite way and monitors in a connection of a section (61) of said release circuit (62) arranged immediately upstream of said contact (65) of said third contactor (52) to its coil (64).

11. Control system according to claim 8, with a relay valve (24) controlled by the pilot pressure for the control of the main air line pressure, wherein said piston (25) pertains to said relay valve (24) and switches, in parallel to each other, said second switching system (34) and a valve system (31) controlling the main air pressure.

12. Control system according to claim 11, wherein said piston (25) is connected to the contacts (77, 78, 79) of said second switching system (34) through prestressed spring-loaded switching tappets (69, 70, 79).

13. Control system according to claim 8, wherein said switching circuit of said coupling(4) can be excited through said first contact (77) of said second switching system (34) and a diode (91).

* * * * *